L. ROWAN.
CORN POPPER.
APPLICATION FILED MAR. 2, 1910.
1,021,426.
Patented Mar. 26, 1912.
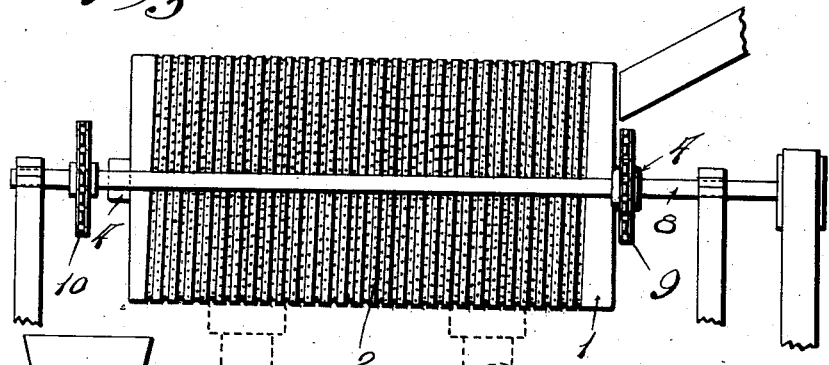
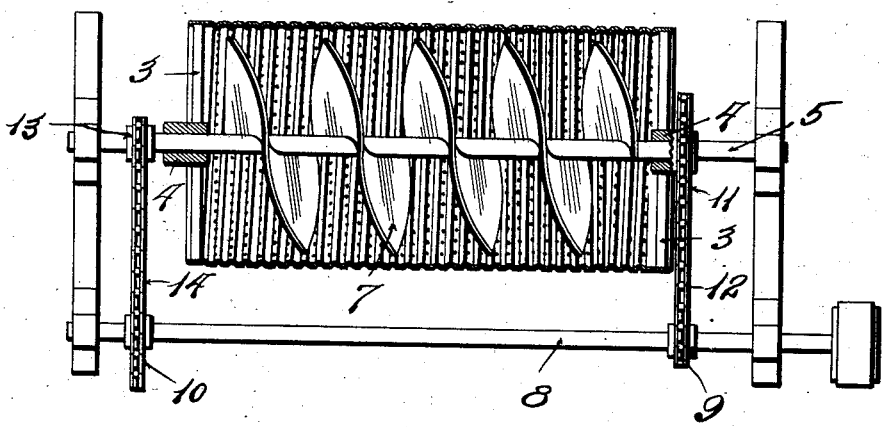
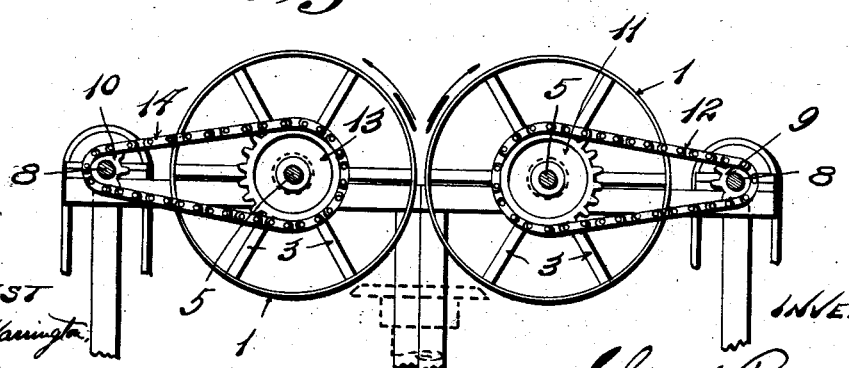
ATTEST
F. W. Harrington
Wm. James
INVENTOR
Lloyd Rowan.

UNITED STATES PATENT OFFICE.

LLOYD ROWAN, OF SHAWNEETOWN, ILLINOIS.

CORN-POPPER.

1,021,426.  Specification of Letters Patent.  Patented Mar. 26, 1912.

Application filed March 2, 1910. Serial No. 546,795.

*To all whom it may concern:*

Be it known that I, LLOYD ROWAN, a citizen of the United States, and residing in Shawneetown, county of Gallatin, State of Illinois, have invented certain new and useful Improvements in Corn-Poppers, as set forth in the annexed specification and claims and illustrated in the accompanying drawings.

My invention relates to a corn popping machine which is simple, easily operated, and of such construction as that the corn popping operation is continuous.

My invention consists essentially of one or more perforated metal cylinders which slowly rotate over a suitable heater or burner, and there being a device in the form of a spiral conveyer operating within each cylinder, for the purpose of preventing the popping kernels of corn from throwing the unpopped kernels out of the ends of the cylinder.

My invention further consists of certain features of novelty hereinafter more fully described, claimed and shown in the accompanying drawings in which:

Figure 1 is a side elevation of a corn popper of my improved construction. Fig. 2 is a horizontal section taken through the center of one of the rotating cylinders of my improved popper. Fig. 3 is an end elevation of the form of popper which employs a pair of the rotating cylinders.

Referring by numerals to the accompanying drawings, 1 designates a horizontally disposed perforated sheet metal cylinder, and formed on the interior thereof and extending approximately the entire length thereof is a spiral groove 2. In some instances the cylinder may be formed of fine wire netting of small mesh. Arranged in the ends of this cylinder are spiders 3, provided with hubs 4 which are loosely mounted on a shaft 5, and said shaft being journaled for rotation in suitable bearings formed on a frame 6. Fixed on the shaft 5 within the cylinder is a spiral conveyer 7, the convolutions of which are comparatively close together and the outer edge of this conveyer travels in a path immediately adjacent the inner surface of the cylinder 1.

Arranged for rotation in suitable bearings in the frame 5 is a driving shaft 8 and fixed thereon is a small sprocket wheel 9 and a large sprocket wheel 10. Fixed on the hub of one of the spiders 3 is a large sprocket wheel 11 and connecting the same with the small sprocket wheel 9 is a sprocket chain 12. Fixed on the shaft 5 is a small sprocket wheel 13 and connecting the same with the large sprocket wheel 10 is a sprocket chain 14. When in operation the shaft 8 is driven and through the medium of the two sets of sprocket wheels and chains the cylinder and the spiral conveyer will be simultaneously rotated in the same direction, and owing to the relative sizes of the sprocket wheels the spiral conveyer will be driven approximately twice as fast as the cylinder.

A suitable heater or burner is placed beneath the cylinder as shown by dotted lines in Fig. 1, or where the cylinders are arranged in pairs the heater or burner is arranged below and between the pair of cylinders as seen by dotted lines in Fig. 3.

The unpopped corn is delivered into one end of the cylinder by means of a spout or in any suitable manner, and as said cylinder rotates the grains of corn ride in the spiral groove 2 and are thereby slowly carried toward the opposite end of the cylinder. As the cylinder is heated the grains of corn will pop in due time, and the unpopped grains will be prevented from being thrown out of the ends of the cylinder by reason of the spiral conveyer which acts as a deflector, and practically divides the interior of the cylinder into a number of compartments. The spiral conveyer operating at a much greater speed than the cylinder carries off the grains of popped corn which of course, are much larger than the unpopped grains, and the popped corn, and the unpopped grains all discharge from the same end of the cylinder into a suitable receptacle. The perforations in the cylinder permit the heat to readily circulate through the cylinders and also permit undersized grains and refuse to discharge from the cylinder.

A corn popper of my improved construction is simple, inexpensive, can be operated with little power and provides simple means whereby the operation of popping corn is rendered continuous.

I claim:

1. In a corn popper, a horizontally disposed rotating cylinder on the inner face of which is formed a spiral groove, and a spiral conveyer arranged for independent rotary movement within the interior of said cylinder which spiral conveyer rotates faster than the cylinder.

2. In a corn popper, a horizontally disposed rotating cylinder on the inner face of which is formed a spiral groove, a spiral conveyer arranged for independent rotation within the interior of said cylinder, and means whereby said cylinder and spiral conveyer are rotated which spiral conveyer rotates faster than the cylinder.

3. In a corn popper, a rotating horizontally disposed cylinder constructed of foraminous material on the inner face of which is formed a spiral groove, and a spiral conveyer arranged for independent rotation within the interior of said cylinder which spiral conveyer rotates faster than the cylinder.

In testimony whereof I hereunto affix my signature in the presence of two witnesses, this 18th day of February, 1910.

LLOYD ROWAN.

Witnesses:
PAUL M. LANG,
AUGUST MEIER.

Copies of this patent may be obtained for five cents each, by addressing the "Commissioner of Patents, Washington, D. C."